Oct. 9, 1956
R. J. MADRUGA
2,766,053
BOAT TRAILER
Filed Sept. 3, 1954
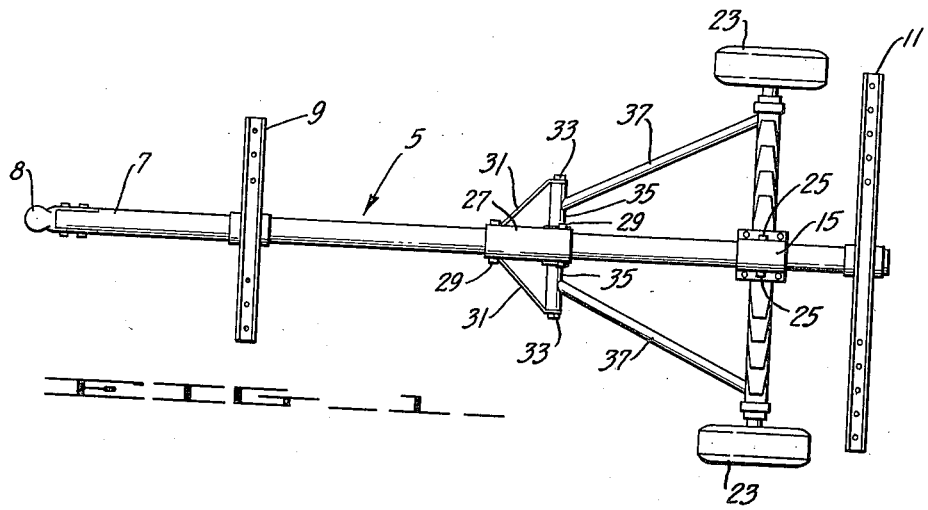
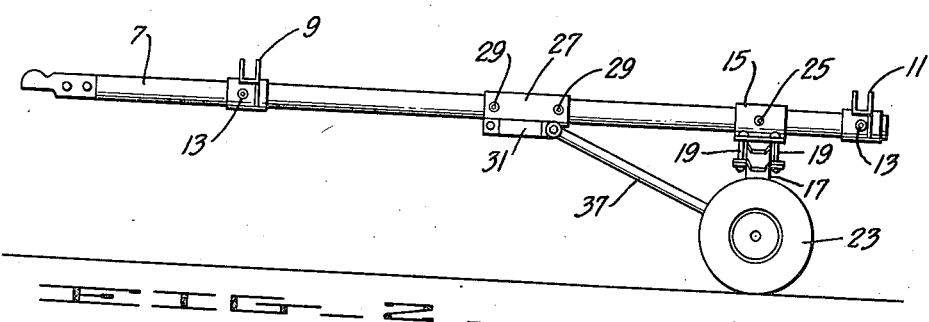
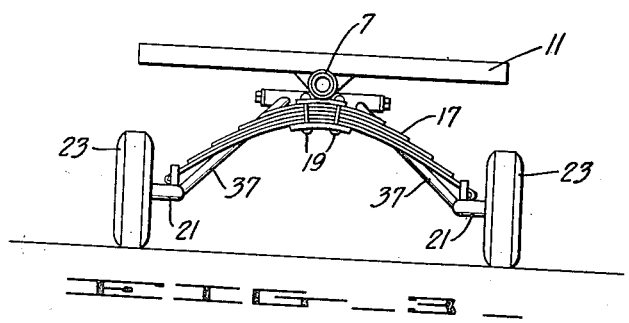
INVENTOR.
Raymond J. Madruga
BY ECKHOFF & SLICK, Attys.
A member of the firm.

United States Patent Office 2,766,053
Patented Oct. 9, 1956

2,766,053
BOAT TRAILER
Raymond J. Madruga, Milpitas, Calif.

Application September 3, 1954, Serial No. 454,114

1 Claim. (Cl. 280—414)

This invention relates to a boat trailer and particularly relates to a boat trailer having independent wheel suspension.

Although boat trailers have been made for many years, trailers heretofore known have not been fully satisfactory since they frequently are of relatively heavy construction, and do not lend themselves well to redistributing loads when boats of different sizes are carried. Further, such trailers are difficult to ship and store since they occupy a considerable amount of room.

It is an object of the present invention to provide a boat trailer of generally improved design which is of light yet strong construction.

Another object of this invention is to provide a boat trailer wherein the wheels are independently sprung whereby jarring of the boat is held to a minimum.

Still another object of this invention is to provide a boat trailer wherein the wheels and boat carriages can be adjusted to various positions to secure the best load distribution when carrying boats of different sizes.

Another object of this invention is to provide a boat trailer which can be easily disassembled so that it can be shipped or stored in the minimum amount of space.

Referring to the drawings forming a part of this application:

Figure 1 is a plan view of my improved boat trailer.

Figure 2 is a side elevational view of the boat trailer of the present invention.

Figure 3 is a rear view of the boat trailer of the present invention.

Referring now to the drawings by reference characters, there is shown a boat trailer, generally designated 5, having a tubular center member 7 and a conventional hitch 8. Mounted on the tubular center member are two boat cradles, designated 9 and 11. Each of these boat cradles is held in place by set screws, or similar adjustable holding devices 13. Also mounted on the central member 7 is a clamp 15, which holds a leaf spring 17 by means of bolts 19 or other suitable fastening means. Mounted at the outer ends of the leaf spring 17 are two axles 21, to which the wheels 23 are attached. The clamp 15 is held in place on the central member 7 by means of set screws 25. Also mounted on the central member 7 is a second clamp 27, held in place with set screws 29. Extending from the clamp 27 are brace members 31, which support a rod 33. The rod 33 is also directly supported by the clamp 27. Mounted for rotation on the rod 33 are two members 35, to which are attached radius rods 37, which extend to the axles 21, as is shown in the drawing.

The members 35 rotate freely on the rod 33, so that an independent springing action results, the rods 37 acting as torque members. Thus, the trailer of the present invention has a very smooth ride and jars the boat as little as possible.

Since the members mounted on the tubular member 7 are all held in place with set screws, it is very easy to completely disassemble the trailer. Thus, the set screws 13, 25 and 29 need only be loosened and the whole assembly can be taken apart for storage or shipment. Further, the boat cradles and the clamps 15 and 27 are easily adjusted along the central member 7 by merely loosening the set screws and moving the members to any desired position. In this manner, one can redistribute the weight when boats of various sizes are carried and thus secure the optimum weight distribution on the trailer.

I claim:

A boat trailer having a single, central frame member, a leaf spring attached to said frame member at the center of the leaf spring, the ends of said leaf spring being attached to a pair of independent short axles for the wheels of the trailer, a pivot member attached to the frame member in spaced relationship to the point of attachment of the leaf spring, and a rod extending from each of said axles to the pivot member and a pair of boat cradles attached to said central frame member, the points of attachment of the leaf spring, the pivot member and the boat cradles being individually adjustable to any points of said central member.

References Cited in the file of this patent
UNITED STATES PATENTS

| | | |
|---|---|---|
| 2,219,401 | Sampsell | Oct. 29, 1940 |
| 2,636,745 | Cartwright | Apr. 28, 1953 |
| 2,657,934 | Linneman | Nov. 3, 1953 |
| 2,691,534 | Sampsell | Oct. 12, 1954 |

FOREIGN PATENTS

| | | |
|---|---|---|
| 927,467 | France | May 5, 1947 |
| 1,015,058 | France | June 25, 1952 |